(12) United States Patent
Sevigny

(10) Patent No.: US 6,269,180 B1
(45) Date of Patent: *Jul. 31, 2001

(54) METHOD AND APPARATUS FOR COMPOSITING IMAGES

(76) Inventor: Benoit Sevigny, 65 Rue St-Paul Ouest, Apartment 103, Montreal, Quebec (CA), H2Y 3S5

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,641

(22) Filed: Apr. 9, 1997

(30) Foreign Application Priority Data

Apr. 12, 1996 (GB) .................................. 9607633

(51) Int. Cl.⁷ .................................................. G06K 9/00
(52) U.S. Cl. ............................................................ 382/162
(58) Field of Search ................................... 382/162, 163, 382/167, 284, 254; 348/96, 97

(56) References Cited

U.S. PATENT DOCUMENTS

| | | | |
|---|---|---|---|
| 4,488,245 | * 12/1984 | Dalke et al. | 364/526 |
| 4,666,271 | * 5/1987 | Gonsot | 352/90 |
| 4,677,576 | * 6/1987 | Berlin et al. | 364/522 |
| 4,771,342 | 9/1988 | Beesley | 358/335 |
| 4,812,904 | * 3/1989 | Maring et al. | 358/107 |
| 4,935,816 | 6/1990 | Faber | 358/160 |
| 5,091,963 | * 2/1992 | Litt et al. | 382/8 |
| 5,319,465 | 6/1994 | Squyres et al. | 358/310 |
| 5,335,293 | * 8/1994 | Vannelli et al. | 382/17 |
| 5,357,294 | * 10/1994 | Shimizu et al. | 351/212 |
| 5,392,072 | 2/1995 | Rodriguez et al. | 348/405 |
| 5,659,382 | * 8/1997 | Rybczynski | 352/46 |
| 5,687,011 | * 11/1997 | Mowry | 358/527 |
| 5,737,456 | * 4/1998 | Carrington et al. | 382/299 |
| 5,809,179 | * 9/1998 | Marimont et al. | 382/254 |
| 5,856,665 | * 1/1999 | Price et al. | 250/205 |

FOREIGN PATENT DOCUMENTS

| | | |
|---|---|---|
| 0 532 883 A1 | 3/1993 | (EP) . |
| WO 87/02852 | 5/1987 | (WO) . |
| WO 93/14591 | 7/1993 | (WO) . |
| WO 95/20292 | 7/1995 | (WO) . |

OTHER PUBLICATIONS

"Segmentation of Synthetic–Aperture Radar imagery of sea ice", International Journal of Remote Sensing, vol. 15, No. 4, pp. 803–825, 1994.

* cited by examiner

*Primary Examiner*—Bhavesh Mehta
*Assistant Examiner*—Kanji Patel
(74) *Attorney, Agent, or Firm*—Skjerven Morrill MacPherson LLP; Alan MacPherson; David T. Millers

(57) ABSTRACT

Image data is processed by identifying a region of substantially constant color within a first image. Color variations, in terms of standard deviation about an average color, are analyzed and a similar level of variation is applied to a second image. The first image may be derived from cinematographic film, with color variations due to film grain. The second image may be a video image or a computer generated image and the application of a similar level of variation may reproduce noise similar to that present within the film due to grain. In this way, it is possible to add grain to non-filmed images so as to match said images to images derived from film.

25 Claims, 15 Drawing Sheets

BACKGROUND

FOREGROUND

COMPOSITE

COMPOSITE TREATED FOR GRANULARITY

COLOR PLANE GRANULARITY CHARACTERISTICS

PERIODICITY P₁ CORRESPONDS TO GRAIN SIZE

SYNTHESIZE A GRANULARITY TEMPLATE SIGNAL FOR A VIDEO IMAGE OR COMPUTER-GENERATED IMAGE

METHOD AND APPARATUS FOR COMPOSITING IMAGES

The present invention relates to processing image data in order to facilitate composting and editing.

INTRODUCTION

The processing of broadcast quality video signals in the digital domain has become increasingly popular and has created a significant number of new production techniques. By using fast digital frame stores and parallel disk drives it is possible to produce full bandwidth digital video signals in real-time, thereby facilitating on-line video editing and compositing. This has led to a demand for such techniques to be used in cinematographic film editing, although the editing of cinematographic film is significantly more difficult given the relatively high information content of film compared to broadcast quality video.

In order for images conveyed by film media to be processed using digital techniques, it is necessary to scan the image frames to produce manipulatable digital image signals. After manipulation, these digital signals are supplied to an exposing device, arranged to expose destination film stock, thereby returning the manipulated image back onto a film medium. From the film viewer's point of view, a manipulated film image should be indistinguishable from an unmanipulated film image.

One area in which there is a problem of being able to distinguish between a manipulated film image and an unmanipulated film image, is where a film clip comprises a plurality of film image frames, each made up of a film image and a video or computer generated image. For example, where a video image or computer generated image of a foreground feature is composited with a filmed image of a background feature, there may be a mismatch in the textural qualities between the foreground image and the background image due to the "graininess" of the film image. The video or computer generated portion of the composite image can lack graininess or noise, or have a different noise characteristic to the portion of the composite clip which originated as a filmed image.

The graininess of a film is a visual sensation experienced by a viewer of the film, in which the viewer experiences a subjective impression of a random dot-like textural pattern in an image. When an image is projected onto a large area screen, the graininess of a filmed image may be readily apparent.

Graininess in a viewed film clip results from the physical composition of the film itself. Motion picture films consist of silver halide crystals dispersed in a gelatin emulsion. The exposure and development of the crystals form the photographic image, which is made up of the discrete particles of silver. In color processes, the silver is removed after development of the film, and dyes form dye clouds centered on sites of developed silver crystals. The crystals can vary in size, shape and sensitivity to light, and are generally randomly distributed within the emulsion.

Individual silver particles can range from about 0.002 mm, down to about 0.0002 mm. In a motion picture, the eye cannot distinguish individual grain particles, however the particles resolve into random groupings of dense and less dense areas which, when viewed, result in the visual sensation of graininess.

FIG. 1 of the accompanying drawings illustrates clouds of dye formed at sites occupied by exposed silver halide. FIG. 2 of the accompanying drawings shows discrete grains at a magnification of around 400×. Grains nearer the surface of the film are in focus, whilst grains deeper in the emulsion are out of focus. FIG. 3 of the accompanying drawings shows the make up of individual grains of filamentary silver enlarged by an electron microscope.

It is known for suppliers of particular film types to produce sets of curves characterizing the graininess of a batch or type of film in terms of the "granularity" of the film. A statistical measure of the granularity of a sample may be supplied by the film manufacturers in the form of an RMS granularity characteristic measured by an electro-optical microdensitometer.

However, an RMS granularity characteristic of a batch of film, or film type, may become inaccurate, due to factors such as temperature, the aging of film, exposure levels and other factors. A knowledge of the RMS granularity of the film on which a particular film clip is recorded will often not give an accurate enough basis for matching the granularity of an individual film clip.

SUMMARY OF THE INVENTION

According to the first aspect of the present invention, there is provided a method of processing image data, comprising steps of identifying a region of substantially constant color within a first image; analyzing color variation within said region; and applying a similar level of variation to a second image.

Preferably, a plurality of regions are selected, wherein each of said regions has a different color. In a preferred embodiment, mean or average values are calculated for the intensities.

In a preferred embodiment, standard deviation values are calculated for the intensities and these values may be considered as a function with respect to color. Preferably, the step of applying a similar level of variation to a second image involves applying a similar standard deviation to areas within said second image.

According to a second aspect of the present invention, there is provided an image data processing apparatus, comprising identification means configured to identify a region of substantially constant color within a first image; analyzing means configured to analyze color variation within said region; and applying means configured to apply a similar level of variation to a second image.

In a preferred embodiment the identification means is configured to identify a plurality of regions of differing colors and said analyzing means may be arranged to calculate mean or average values for said color variations. Preferably, the analyzing means is configured to calculate standard deviation values and said deviation values may be calculated with respect to each color.

In a preferred embodiment, the analyzing means analyzes standard deviation values of said first image and said applying means is configured to apply similar degrees of standard deviation to said second image.

Means may be provided for deriving the first image from cinematographic film. Means may be provided for deriving said second image from video data or, alternatively, a computer may be configured to generate said second image.

In a preferred embodiment, the analyzing means is configured to analyze a plurality of regions by traversing linearly across the first image.

DETAILED DESCRIPTION OF THE PREFERRED EMBODIMENTS

Figure 1:
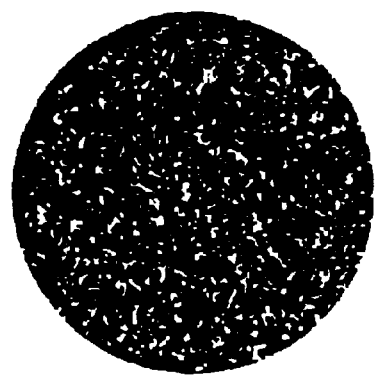
FIGS. 1 to 3 show examples of granularity in cinematographic film.
Figure 2:
Figure 3:
Figure 4:
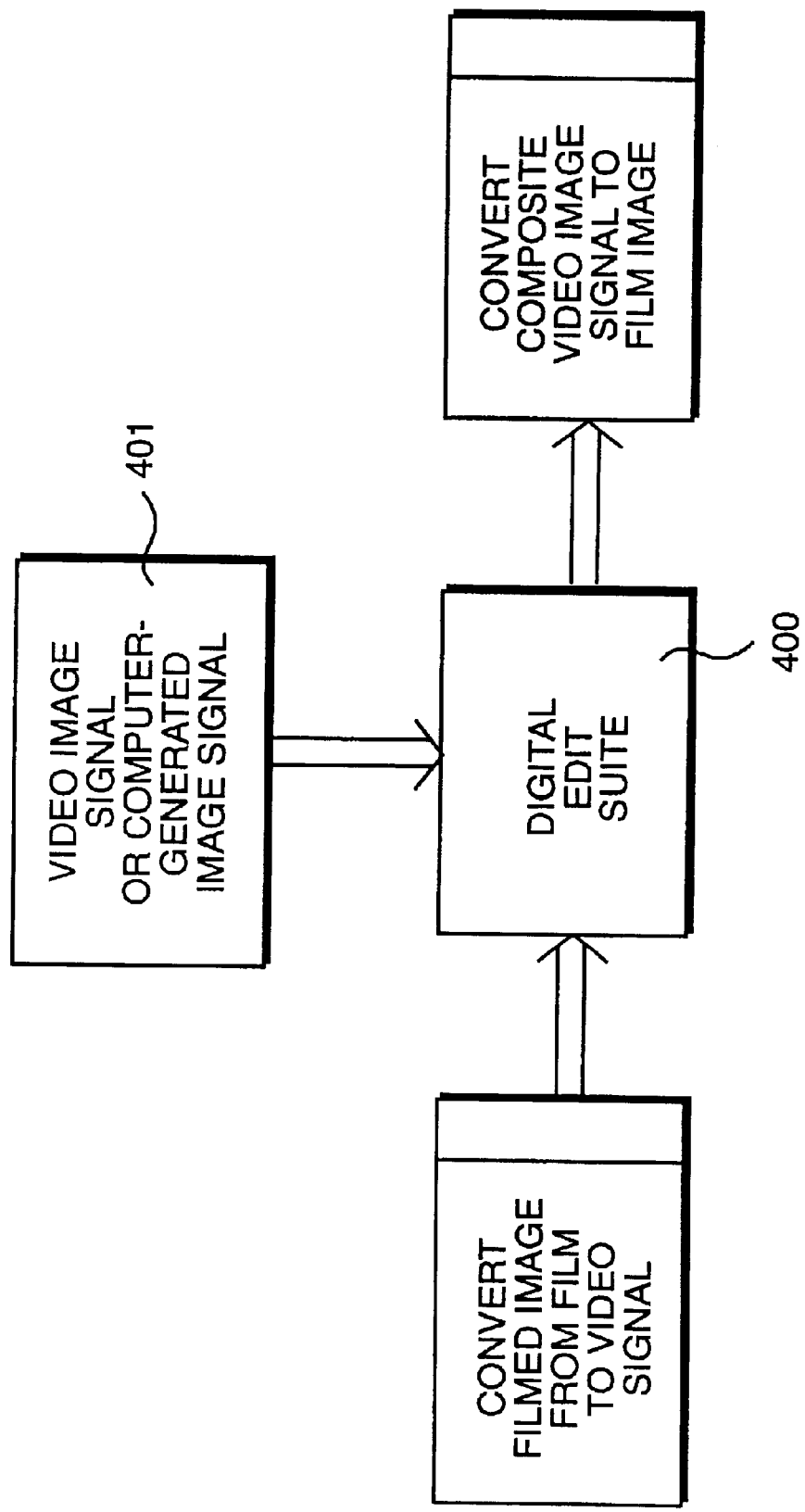
FIG. 4 shows a general overview of a compositing process.

Referring to FIG. 4 of the accompanying drawings, there is shown an overview of a general preferred process for compositing film image data with video image data or computer generated image data. The filmed image is converted to a first digital image signal corresponding to the film image data, and the first digital image signal is entered into a digital editing suite 400. A second digital signal corresponding to a video image or computer generated image, generated by a video source or computer source 401, is input to the editing suite 400, and the first digital image signal is composited with the second digital image signal to produce a composite digital image signal. The composite video image signal is converted to a film image on a reel of film by exposing the film.

Figure 5:
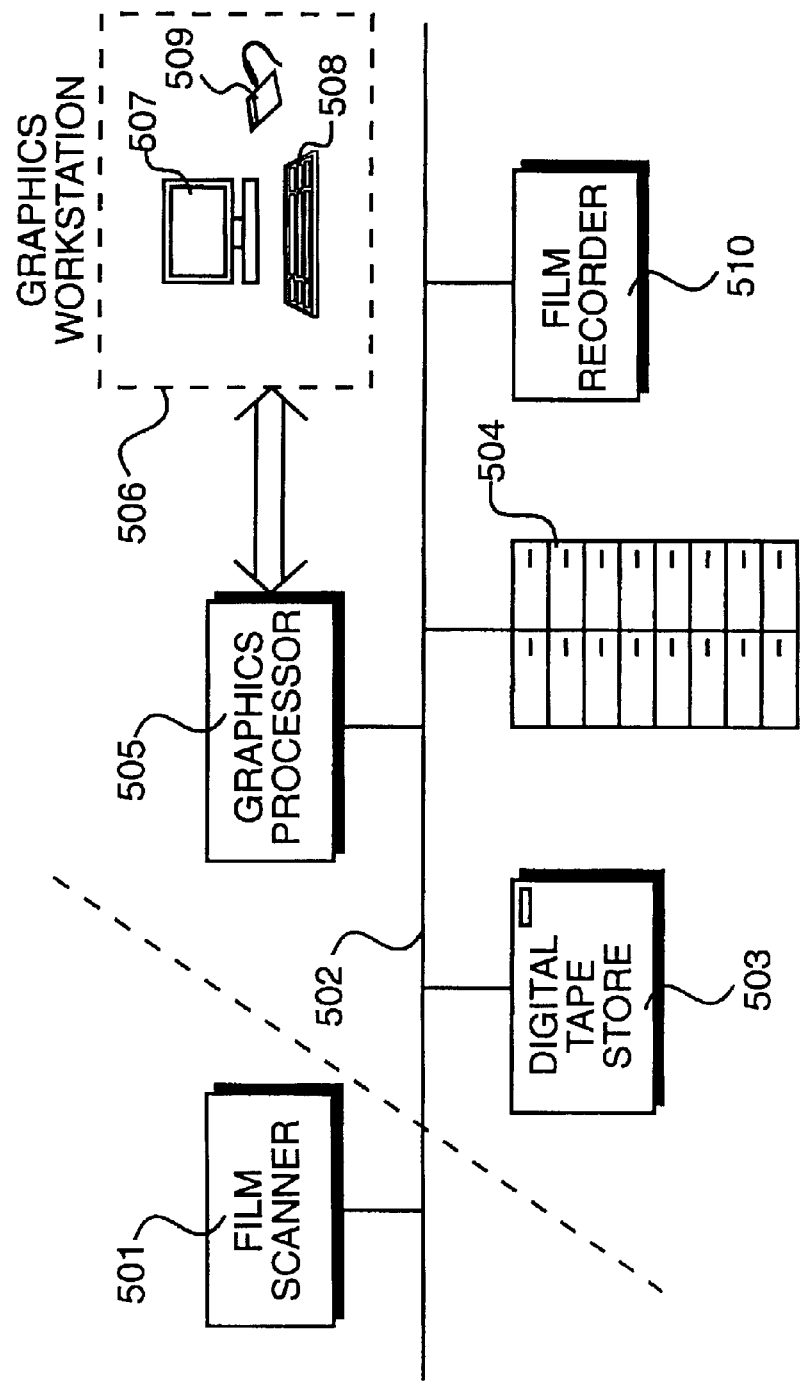
FIG. 5 shows an image processing apparatus adapted for compositing a video image or computer generated image with a film image and applying an appropriate granularity texture to the composite image.

Referring to FIG. 5 of the accompanying drawings, there is shown an apparatus for performing the process as described above. The first digital image signal may be produced by a film scanner 501 and passed along a wideband data bus 502 for storage in a high capacity storage device 504. The second digital image signal, corresponding to a video image or a computer generated image may be input from a video signal source device or computer signal source device attached to the data bus 502. The first digital image signal and second digital image signal may be composited in a graphics processor 505, linked to a graphics workstation 506 comprising a screen 507, a control keypad 508, and a tablet and pen 509. A resulting composite digital image signal may be downloaded and converted back to a film storage medium by a film recorder 510 receiving the composite digital image signal from the data bus 502.

In the present specification it will be understood that the signals carry data corresponding to images and the data may be converted to signal form, for storage purposes and data processing operations. Selection or identification of a portion of a displayed image may correspond to selection or identification of the corresponding data for that portion.

Figure 6:
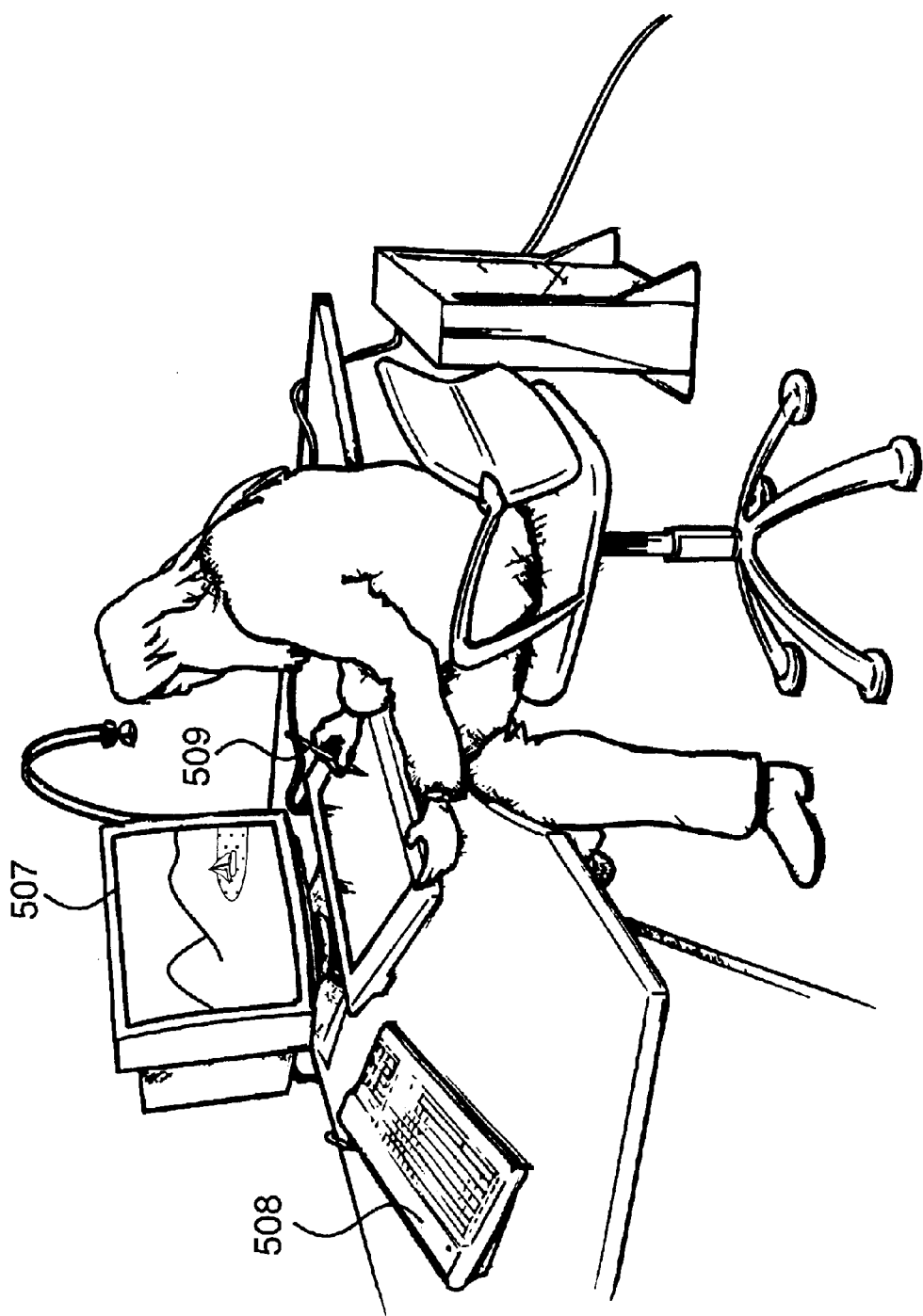
FIG. 6 shows a graphics work station comprising the image processing apparatus.

FIG. 6 shows schematically an editing artist in overall control of the compositing process at the graphics workstation 506.

Figure 7:
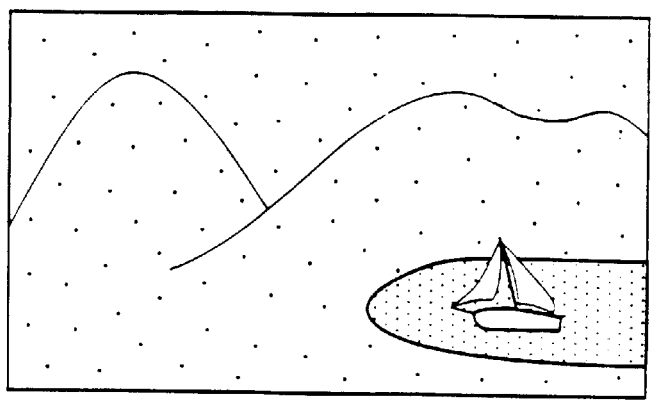
FIG. 7 shows an overview of a process for applying a grain texture in a composite image.

Referring to FIG. 7 of the accompanying drawings there is shown a background image frame on film, the background image being subject to a spatial intensity texture or granularity, which as seen by a viewer would be described as a "graininess" of the image.

Figure 8:
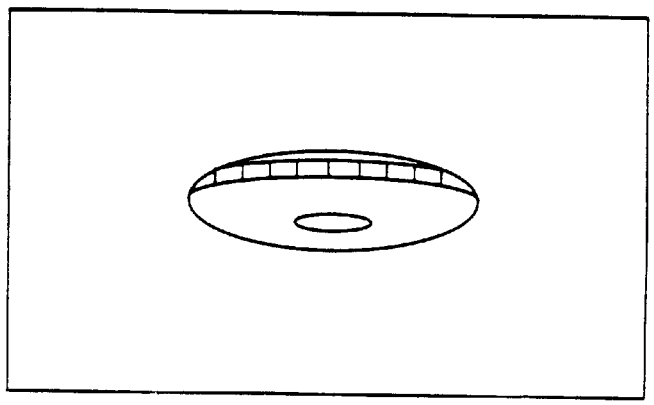
FIG. 8 shows a background film image.

Referring to FIG. 8 of the accompanying drawings, there is shown a video image frame or computer generated image frame, having no graininess as seen by the observer.

Figure 9:
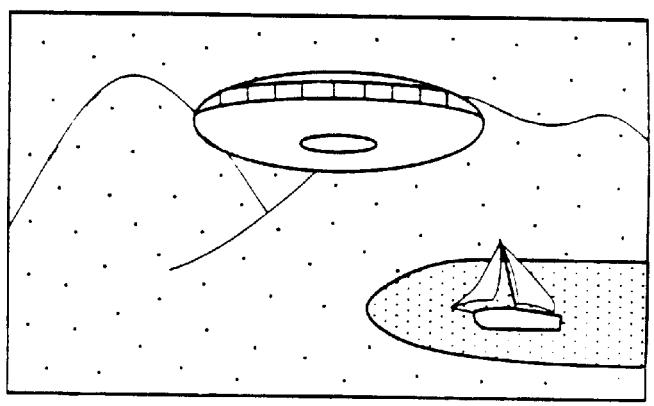
FIG. 9 shows a foreground video image or computer generated image.

Shown in FIG. 9 of the accompanying drawings, is a composite image comprising the background image of FIG. 7 and the foreground image of FIG. 8. In the composite image, the observer perceives a difference in the graininess of the foreground object and the background. The difference in graininess between foreground and background objects is undesirable in the composite image since the human observer perceives the composite image to be unrealistic.

Figure 10:
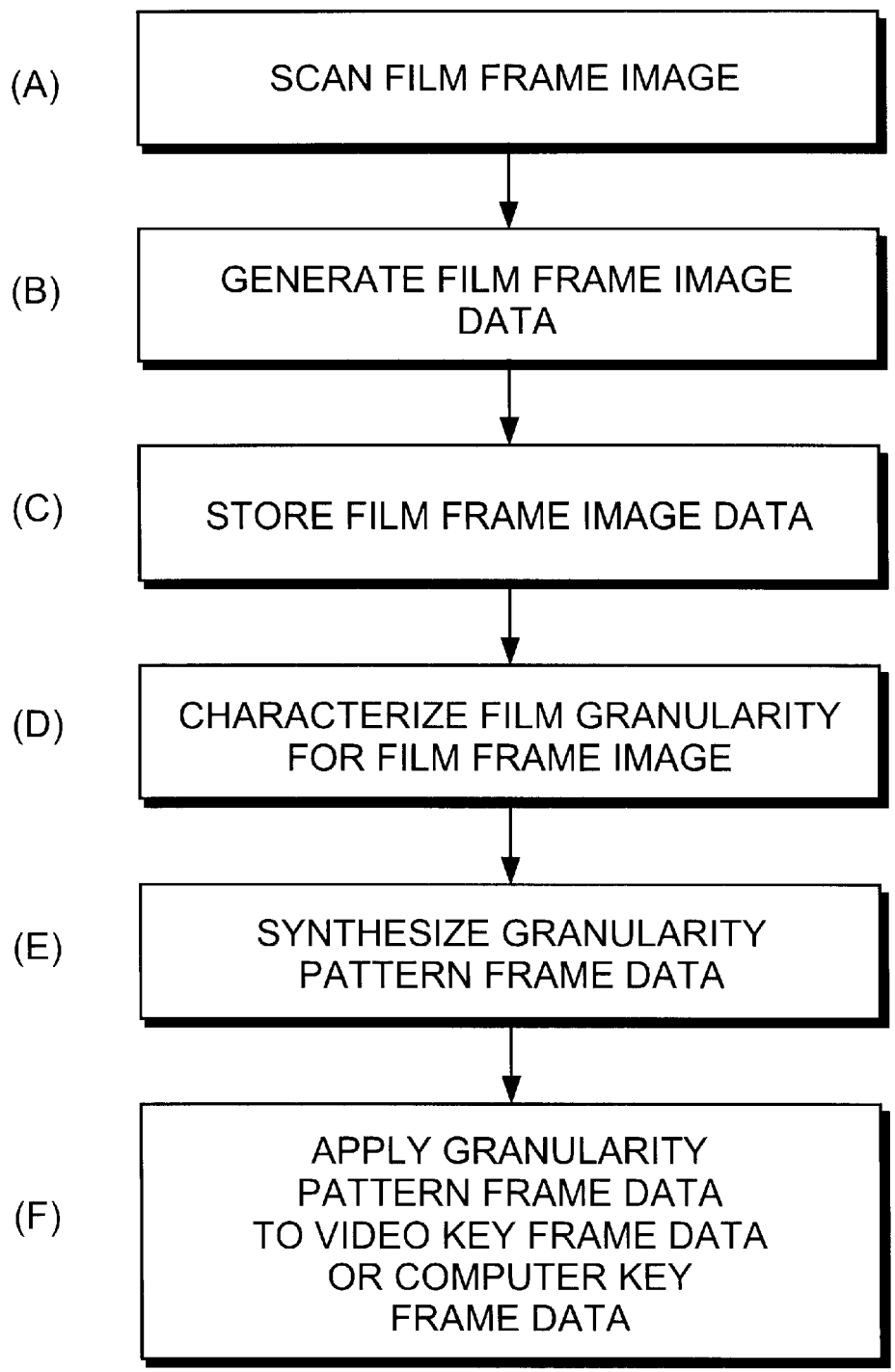
FIG. 10 shows a composite image of the background and foreground images of FIGS. 8 and 9.

Referring to FIG. 10 herein, there is described an overview of a process for producing a composite image data derived from filmed image data or signal and a video or computer generated image or signal, in which the video or computer generated portion of the composite image data or signal has applied thereto a textural pattern data or signal synthetically generated to match the grain texture of the filmed background image.

Figure 11:
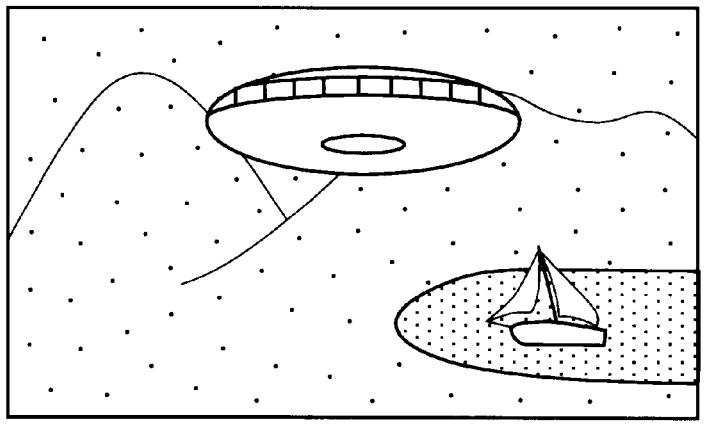
FIG. 11 shows the composite image of FIG. 10, having applied thereto a grain texture.

FIG. 11 herein illustrates the resultant composite image having applied thereto the synthetically generated grain texture.

There will now be described a method of characterizing a grain texture of a filmed image, with reference to FIGS. 12 to 19 of the accompanying drawings.

A frame of filmed image is converted into a first digital image signal as described above. The first digital image signal may be a video signal. The first digital image signal is displayed upon a display device, in this case the display unit 507 of the graphics work-station. The first digital image as displayed, is illustrated schematically with reference to FIG. 12 herein.

Figure 12:
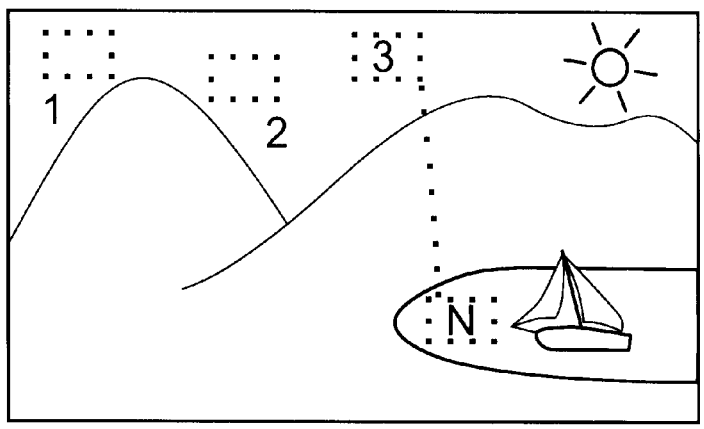
FIG. 12 shows a method of scanning the film background image of FIG. 8.

An operator of the graphics work-station, e.g. a film editing artist, using an electronic cursor and the tablet and stylus 509, identifies a region of the displayed image in which there is a relatively uniform region, for example the region 1 in FIG. 12. By relatively uniform it is meant relatively uniform with respect to overall color.

Figure 13:
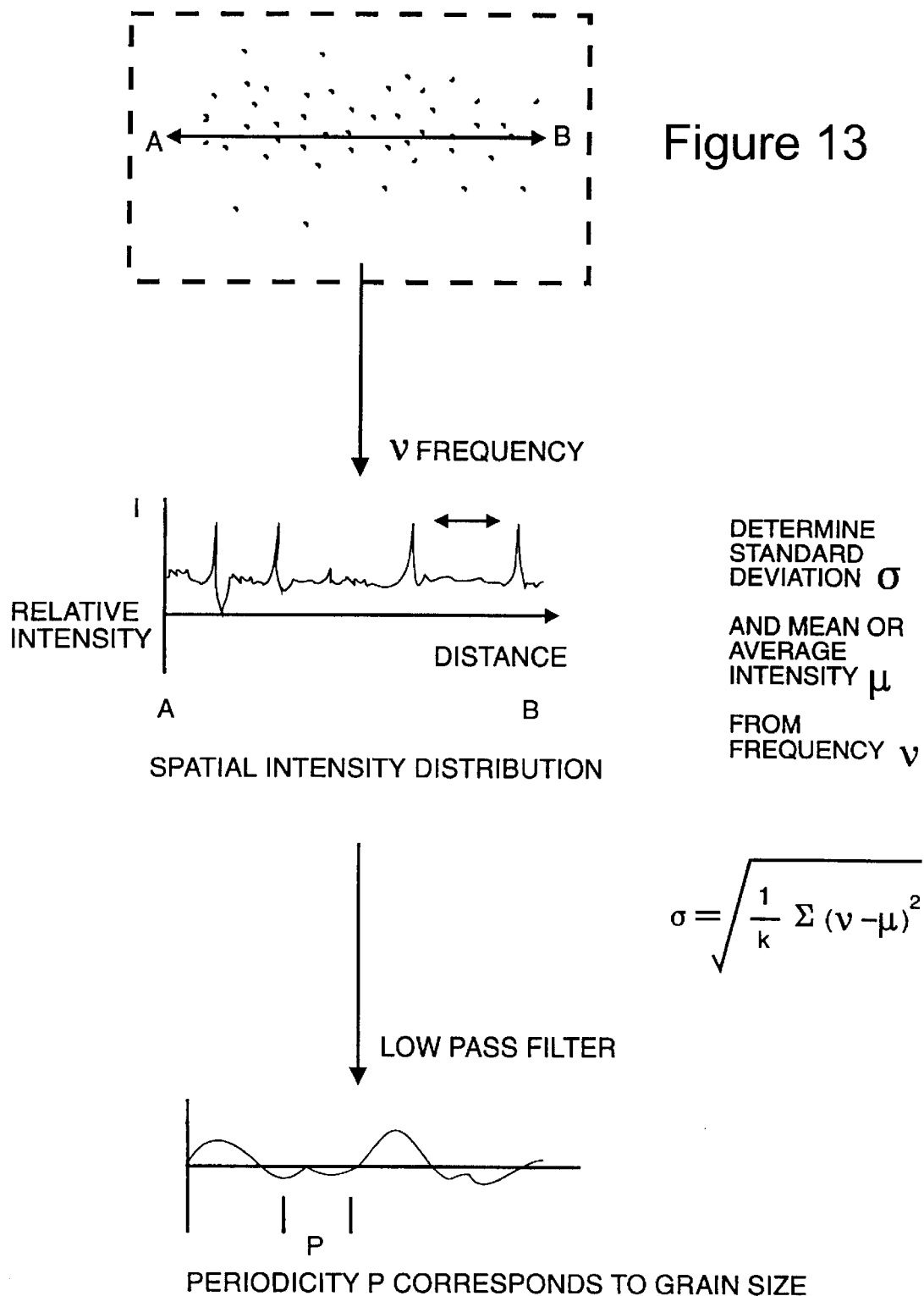
FIG. 13 shows a method of sampling and characterizing a granularity of a portion of the filmed image of FIG. 12.

Referring to the upper portion of FIG. 13 herein, there is shown the region 1 of FIG. 12 in magnified form. The region 1 of the image displayed on the display unit corresponds to a corresponding region of the original film image contained on the film. The granularity of the original film of the film clip causes fluctuations in the intensity of the portion of the first digital image signal corresponding to the displayed region of relatively uniform color 1. On selecting a region of relatively uniform color, the assumption is made that any variations in the intensity across region 1 are caused by the granularity of the original film frame corresponding to region 1.

Once the operator has identified relatively uniform region 1, the graphics processor 505 operates to scan the region of relative uniformity, for example along a straight line between spatially disparate points A and B as shown in FIG. 13. As the graphics processor 505 scans the corresponding region of the first digital image signal, corresponding to the spatially disparate positions A and B on the displayed image, the processor records values of intensity against distance. Where the first digital image signal is a video signal, the processor may record variations in intensity on a pixel by pixel basis.

The portion of the first digital image signal corresponding to the line AB in the region 1 may be filtered into separate color components corresponding to red, green and blue components. For each of the red, green and blue components, a characteristic of intensity versus distance may be recorded and stored. The resultant plot of intensity versus distance, for the purposes of convenience in this specification shall be referred to as a spatial intensity distribution.

The spatial intensity distribution is then further processed as follows.

It has been found that the variation of intensity with distance over a region of a filmed image fluctuates in accordance with the granularity of the film. To characterize the granularity of the film the spatial intensity distribution from the line A–B of the region 1 of the first digital image signal is firstly averaged by computer program applying an algorithm to the data of the spatial intensity distribution, to produce a mean or average value mu. The standard deviation of intensity as it varies above and below the mean or average intensity mu is determined. For example the standard deviation sigma may be determined in accordance with the formula shown in FIG. 13, where:

sigma=standard deviation of intensity.

mu=mean or average intensity over the region AB

K=a constant, and lambda=frequency of intensity fluctuations.

Secondly, by determining the gradient of intensity fluctuations with distance over the line A–B, a periodicity P of intensity fluctuations around the mean or average value mu may be determined from the gradient characteristic. The periodicity P is dependent upon the grain size in the original filmed image.

Thus, for the region 1, sampled along the line A–B, information about the granularity of the original film may be determined and characterized in terms of the parameter's standard deviation, mean or average intensity (mu), and periodicity P of the gradient of intensity change. This data gives information about the granularity of the film used in the film clip from a small relatively uniform sample region 1 of one frame of the film clip at one overall color.

However, the film clip comprises a large number of image frames, and the color varies over each image frame. A general objective in characterizing the grain texture of the film used for the film clip is to select specific regions of relative uniformity. Since, in the absence of grain structure in the film, individual regions of relatively constant overall color ought not to show any variations in color intensity in either of the three red, green or blue components, any variations in intensity determined from the first digital image signal portions corresponding to the regions of relative uniformity ought to be due solely to the granularity of the originating film.

To obtain a better characterization of the grain texture of the originating film, the steps shown in FIG. 13 are repeated for a number of different regions of relative uniformity. The different regions of relative uniformity should be of different colors. Each region of relative uniformity of different color will have its own particular value of mean or average intensity mu for the red, green and blue components.

Figure 14:
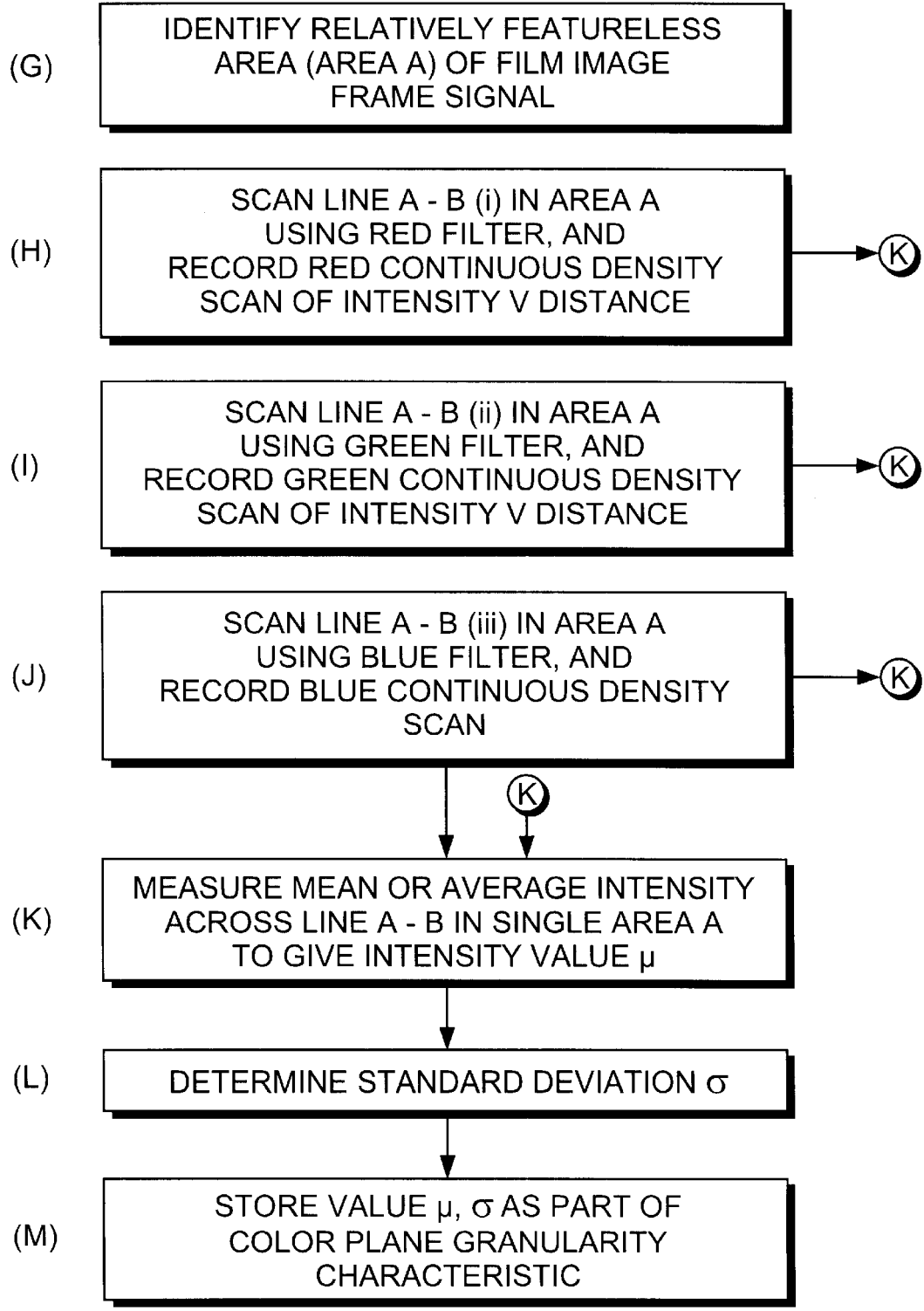
FIG. 14 shows schematically a process for characterizing a granularity of a region of a filmed image.

The steps are summarized in schematic form in FIG. 14.

Figure 15:
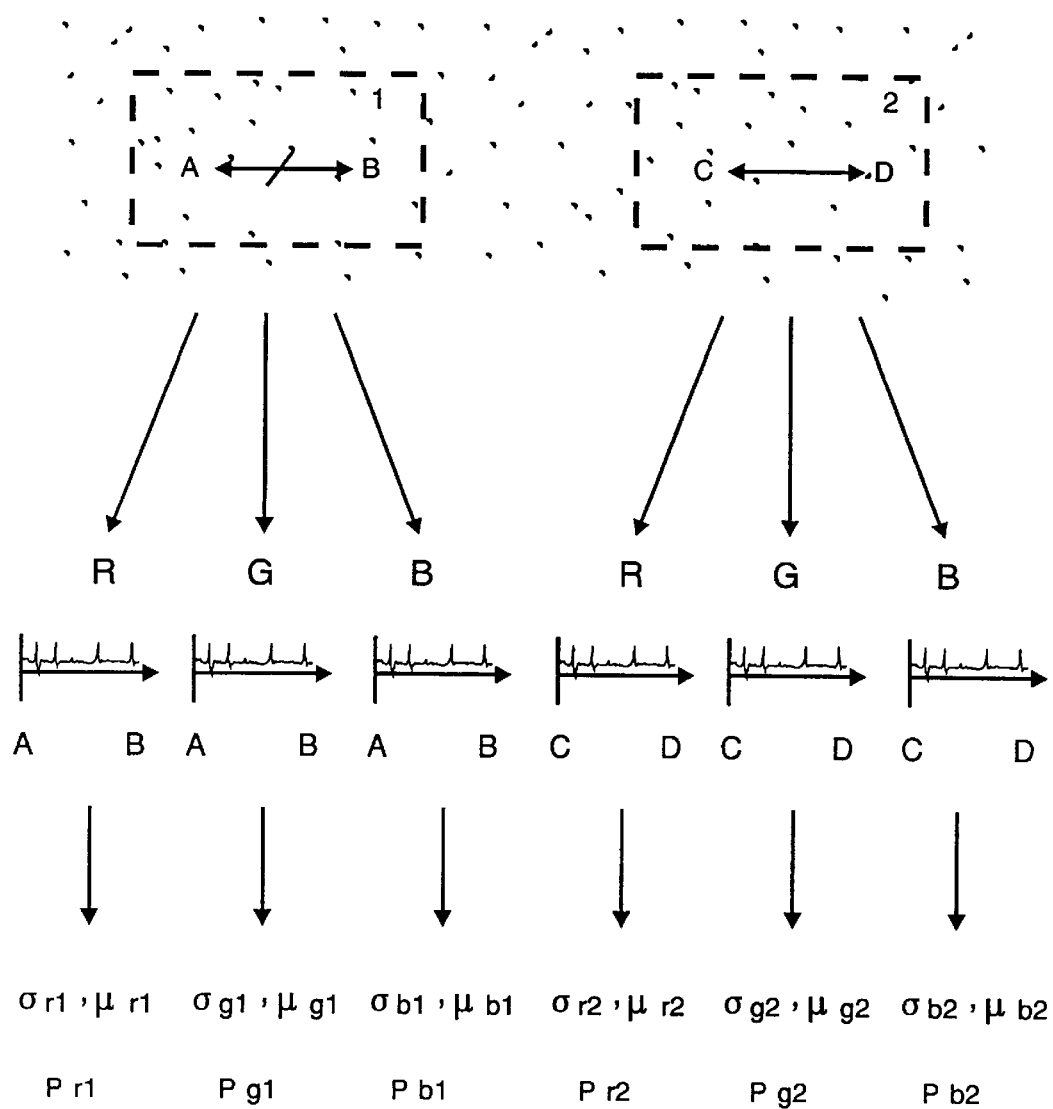
FIG. 15 shows a spatial intensity distribution of a region of the filmed image.
Figure 16:
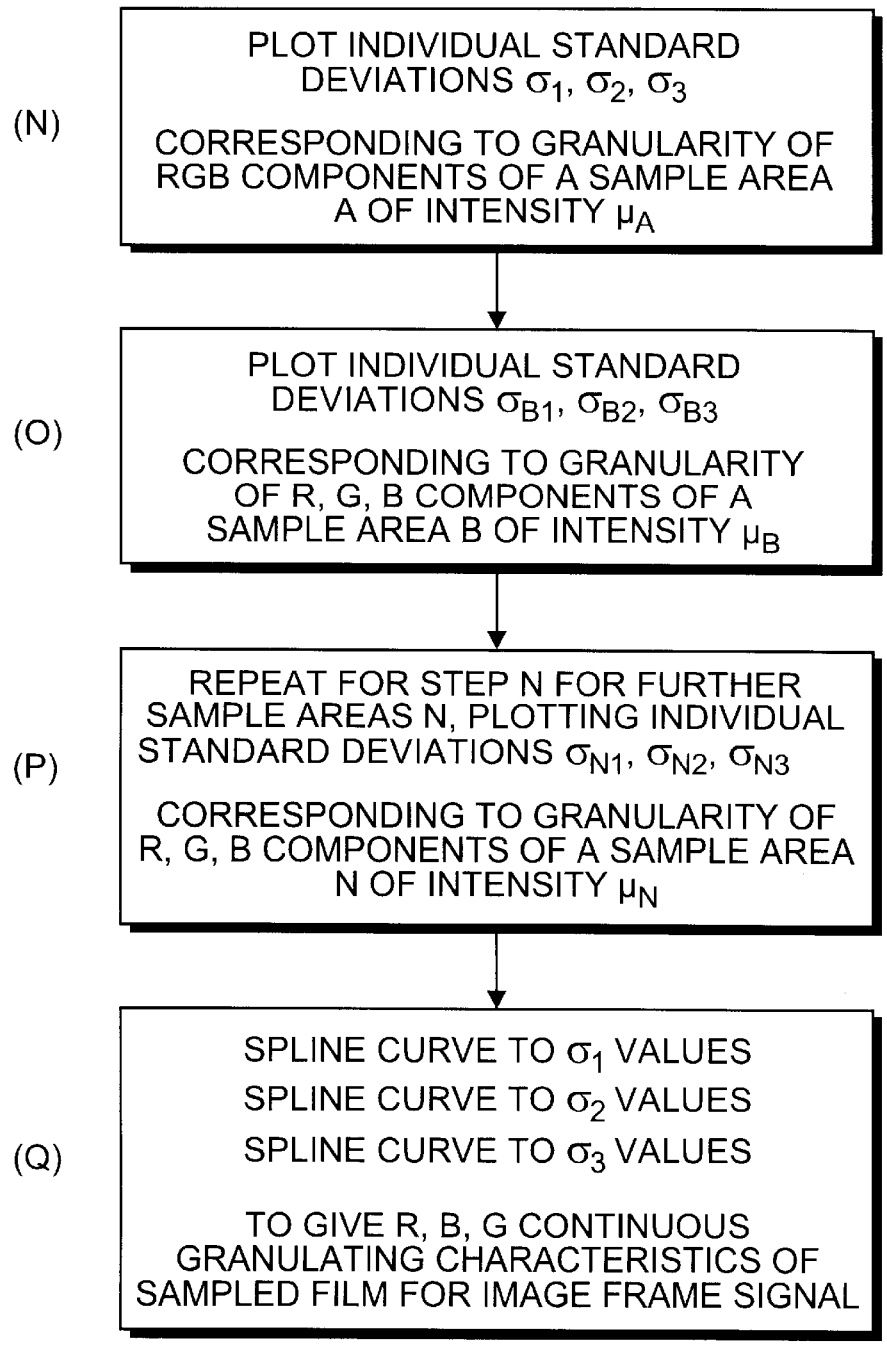
FIG. 16 shows a gradient of the spatial intensity distribution function of FIG. 15.

Referring to FIG. 15 of the accompanying drawings, there are shown first and second regions of relative uniformity 1, 2 which are respectively sampled along lines A–B and C–D. Each sampling results in corresponding spatial intensity distributions along lines A–B and C–D in the red, green and blue components. There may be determined by a plurality of standard deviations sigma r1, sigma g1, sigma b1, sigma r2, sigma g2, sigma b2 corresponding to the spatial intensity distributions of the first and second regions. Similarly, for each spatial intensity distribution there may be determined a particular value of P relating to the grain size.

Figure 17:
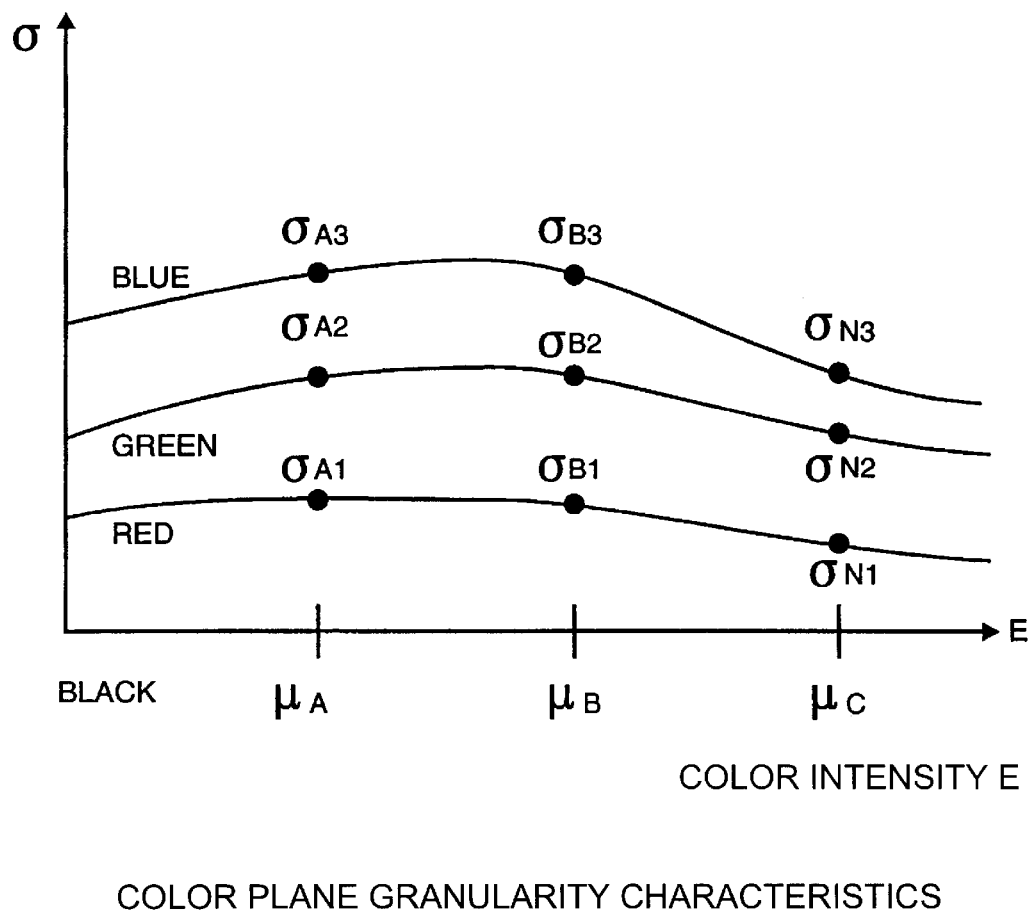
FIG. 17 shows schematically characterization of granularity of first and second regions of the filmed image of FIG. 8.

Referring to FIGS. 12 to 17 of the accompanying drawings, where a number N of individual regions of relative uniformity are sampled, there may result in a number N of values mu, mu 1 . . . mu N. For each value of mu, there will result a corresponding value of sigma. Values of mu and sigma may be plotted as shown in FIG. 17 with mu on the horizontal axis and sigma on the vertical axis, to produce a color plane granularity characterization map which characterizes the granularity of the originating film by finding discrete points of standard deviation at discrete values of mean or average color intensity mu.

By sampling N regions, a continuous curve for each of the red, green and blue components may be approximated by fitting a polynomial expression to the determined values of sigma for the respective red, green and blue components.

Figure 18:
FIG. 18 shows schematically a process for production of granularity characteristics from a plurality of spatial intensity distributions sampled at various regions on the filmed image of FIG. 8.
Figure 19:
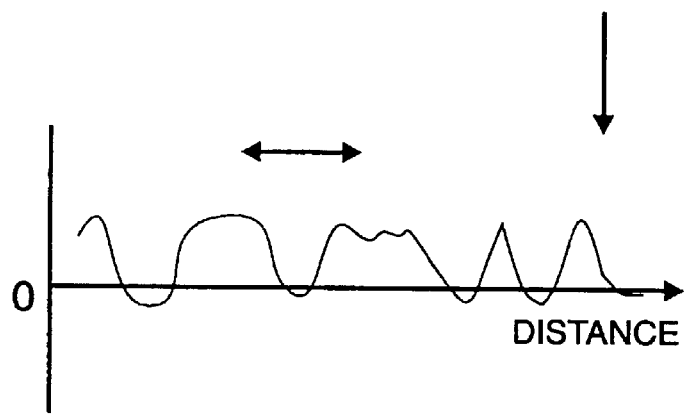
FIG. 19 shows a granularity characteristic determined in accordance with a specific method according to the present invention.

Referring to FIGS. 18 and 19 of the accompanying drawings, there is shown graphically, a preferred method for determining the grain size P from the spatial intensity distributions.

FIG. 18 shows a spatial intensity distribution of, for example, a red component. FIG. 19 shows the gradient of the spatial intensity distribution of FIG. 18. A periodicity P is determined as a most prominently present fundamental frequency of the gradient of the intensity, over the sample region A–D.

A preferred method of synthetically generating a granularity template signal or data for applying to the second digital image signal corresponding to the video image or the computer generated image, will now be described.

Figure 20:
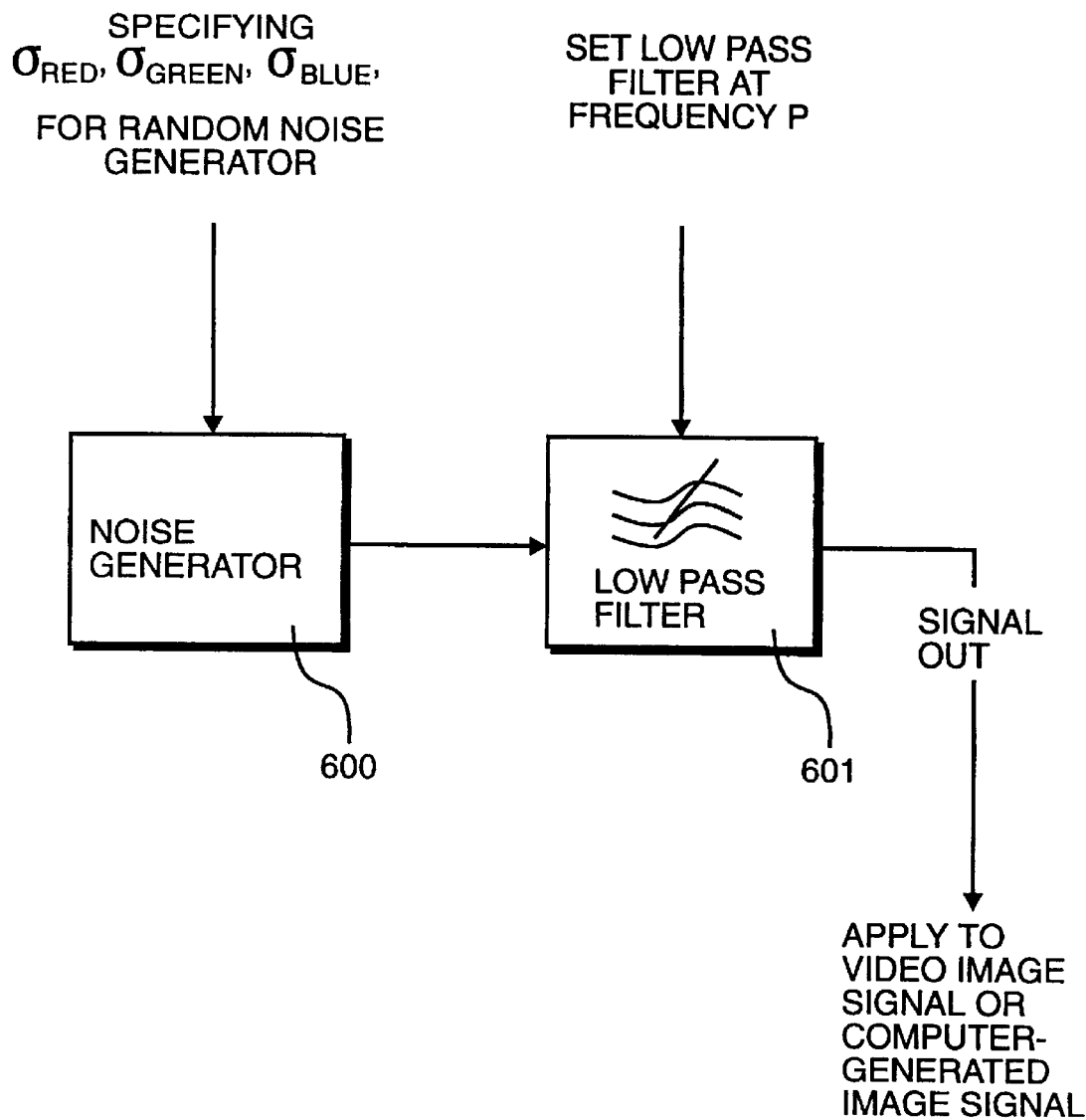
FIG. 20 shows a general process for synthesization of a granularity template signal for a video image or computer generated image.
Figure 21:
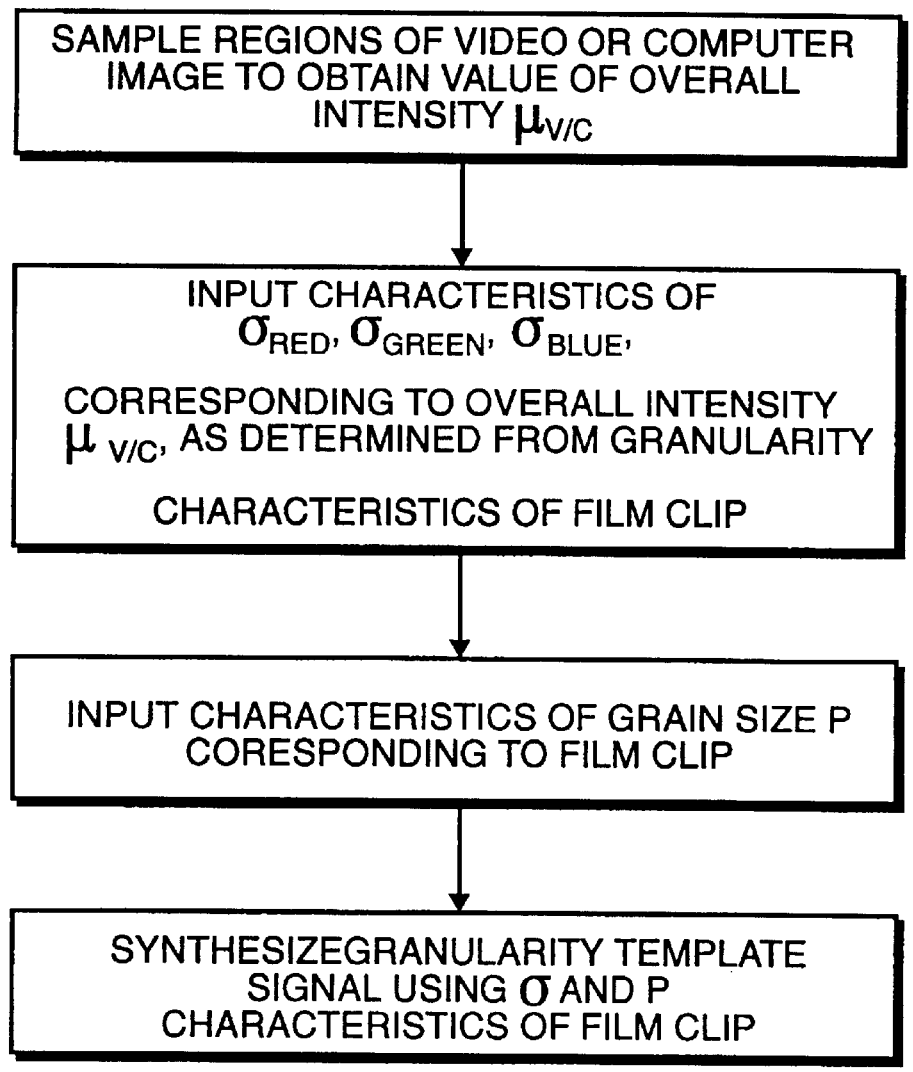
FIG. 21 shows schematically an apparatus for synthesization of the granularity template signal for a video image or computer generated image.

Referring to FIG. 20 of the accompanying drawings, a noise generator 600 generates signal intensity noise to mimic the intensity fluctuations in the first digital image signal produced by the granularity of the film. A low pass filter 601 filters the noise signal generated by the noise generator 600.

The noise generator 600 produces noise having a standard deviation which can be specified by inputting a standard deviation value sigma. The low pass filter can filter the random noise signal generated by the noise generator 600 with a cut off frequency determined by the periodicity P, which characterizes the grain size of the originating film clip.

In the composite signal, comprising the first digital image signal and the second digital image signal, the first digital image signal contains information relating to the granularity of the originating film. By applying the granularity template signal produced by the random noise generator 600 and low pass filter 601, the granularity template signal is produced having characteristics which relate to the granularity of the film. This is then used to produce an effect on the second digital image signal (the signal corresponding to the video image or to the computer generated image) which mimics the granularity of the originating film when an image corresponding to the composite digital image signal is displayed.

When the composite digital image signal is transferred back to film medium via the film recorder 510, the resultant film holds an image comprising the image on the original originating film clip plus the keyed-in video image or computer generated image, in which the keyed-in portion of the composite image contains a granularity effect comparable to that on the originating film.

What is claimed is:

1. A method of processing image data, comprising the acts of:
   identifying at least one region of substantially constant color within a first image;
   determining at least one intensity variation within each of said at least one region, thereby generating at least one intensity distribution function of distance;
   calculating at least one statistical parameter from said at least one intensity distribution function;
   applying an intensity variation, based on said at least one statistical parameter, substantially randomly within a second image; and
   determining sizes of grains associated with said first image, wherein said determining said sizes of grains further includes determining a fundamental frequency of at least one of said intensity as a function of distance.

2. A method according to claim 1, wherein each of said at least one region has a different color.

3. A method according to claim 1, wherein said first image is derived from cinematographic film.

4. A method according to claim 1, wherein said second image is derived from a video.

5. A method according to claim 1, wherein said second image is computer generated.

6. A method according to claim 1, wherein said applying an intensity variation randomly within said second image includes applying a plurality of grains having said sizes according to at least one said standard deviation.

7. A method according to claim 1, wherein said function of distance across each region comprises linearly traversing across each said region.

8. A method according to claim 1, wherein said at least one statistical parameter comprises a mean of said at least one intensity distribution function.

9. A method according to claim 1, wherein said at least one statistical parameter comprises a standard deviation of said at least one intensity distribution function.

10. A method according to claim 9, wherein said intensity variation substantially randomly within said second image is based on said at least one said standard deviation.

11. The method of claim 1, wherein said act of applying comprises applying a grain texture of said first image among said second image without changing a perceived color of said second image.

12. Image data processing apparatus, comprising:
    identification circuitry to identify at least one region of substantially constant color within a first image;
    analyzer circuitry to determine at least one intensity variation within each of said at least one region, thereby to generate at least one intensity distribution function of distance, said analyzer, circuitry further determines sizes of grains associated with said first image, wherein said analyzer circuitry determines said sizes of grains from a fundamental frequency of at least one said intensity as a function of distance;
    calculator circuit to calculate said at least one statistical parameter from said at least one intensity distribution function; and
    application circuitry to apply an intensity variation, based on said at least one statistical parameter, substantially randomly within a second image.

13. Apparatus according to claim 12, wherein each of said at least one region has a different color.

14. Apparatus according to claim 12, including circuitry for deriving said first image from cinematographic film.

15. Apparatus according to claim 12, including circuitry for deriving said second image from video.

16. Apparatus according to claim 12, including a computer configured to generate said second image.

17. The apparatus of claim 12, wherein said application circuitry applies within said second image a plurality of said grains having said sizes according to at least one said standard deviation.

18. The apparatus of claim 12, wherein said function of distance across said region comprises a linear traversal across each of said at least one region.

19. The apparatus of claim 12, wherein said application circuitry further includes
    a noise generator circuit for generating noise signals according to said intensity variation; and
    a filter circuit coupled to filter said noise signals, said filter circuit for providing said intensity variation randomly within said second image.

20. The apparatus of claim 19 wherein a cut off frequency of said filter circuit is based on at least one linear intensity variation across said at least one region.

21. The apparatus of claim 12, wherein said at least one statistical parameter comprises a mean of said at least one intensity distribution function.

22. The apparatus of claim 12, wherein said at least one statistical parameter comprises a standard deviation of said at least one intensity distribution function.

23. The apparatus of claim 22 wherein said intensity variation substantially randomly within said second image is based on said at least one standard deviation.

24. A method of processing image data, comprising the acts of:
    identifying at least one region of substantially constant color within a first image;
    determining at least one intensity variation within each of said at least one region, thereby generating at least one intensity distribution function of distance;
    calculating at least one statistical parameter from said at least one intensity distribution function, wherein said at least one statistical parameter comprises a most prominent periodicity of said at least one intensity distribution function; and applying an intensity variation, based on said at least one statistical parameter, substantially randomly within a second image.

25. Image data processing apparatus, comprising:

identification circuitry to identify at least one region of substantially constant color within a first image;

analyzer circuitry to determine at least one intensity variation within each of said at least one region, thereby to generate at least one intensity distribution function of distance;

calculator circuit to calculate said at least one statistical parameter from said at least one intensity distribution function, said at least one statistical parameter comprises a most prominent periodicity of said at least one intensity distribution function; and application circuitry to apply an intensity variation, based on said at least one statistical parameter, substantially randomly within a second image.

* * * * *